(12) United States Patent
Chun et al.

(10) Patent No.: US 6,997,029 B2
(45) Date of Patent: Feb. 14, 2006

(54) ROLLER CAM MECHANISM AND DRIVE ASSEMBLY WITH POSITIVE RETRACTION

(75) Inventors: Victor L. Chun, Walton Hills, OH (US); Joseph Mouzaya, Strongsville, OH (US)

(73) Assignee: Danly IEM, a division of Connell Limited Partnership, Boston, MA (US)

( * ) Notice: Subject to any disclaimer, the term of this patent is extended or adjusted under 35 U.S.C. 154(b) by 204 days.

(21) Appl. No.: 10/703,203

(22) Filed: Nov. 5, 2003

(65) Prior Publication Data

US 2005/0092055 A1 May 5, 2005

(51) Int. Cl.
*B21D 5/04* (2006.01)
(52) U.S. Cl. ...................... 72/452.9; 72/452.8; 72/387; 72/315

(58) Field of Classification Search ............. 724/452.8, 724/452.9, 387, 315
See application file for complete search history.

(56) References Cited

U.S. PATENT DOCUMENTS

| 1,999,057 | A | * | 4/1935 | Peterson et al. | ........... 72/452.9 |
| 6,079,250 | A | * | 6/2000 | Scannell | ................... 72/452.9 |
| 6,196,040 | B1 | * | 3/2001 | Matsuoka | ................... 72/452.9 |
| 6,519,995 | B1 | * | 2/2003 | Matsuoka | ................... 72/452.9 |

* cited by examiner

*Primary Examiner*—David B. Jones
(74) *Attorney, Agent, or Firm*—John R. Benefiel

(57) ABSTRACT

A roller cam mechanism and driver assembly which features a positive retraction cam elements comprised of auxiliary rollers and side plate slots which cooperate upon failure of a retraction spring compressed by advance of a tooling slide to cause positive retraction of a tooling slide.

6 Claims, 5 Drawing Sheets

US 6,997,029 B2

ROLLER CAM MECHANISM AND DRIVE ASSEMBLY WITH POSITIVE RETRACTION

BACKGROUND OF THE INVENTION

This invention concerns roller cams which are widely used in die presses to carry out such functions as piercing holes into a workpiece which is engaged in the press by forming dies. Roller cams utilize a roller engaged by a driver which is fixed to a press platen, which roller is mounted to a slide so as to be advanced by a ramp surface as the driver is advanced by the platen motion. Sliding cams are not operated at angles other than horizontal due to friction, and are more bulky and costly than roller cams.

A spring is used to return the slide in roller cams. However, if stripping is necessary as when piercing the workpiece with punch tooling, the tool must be withdrawn by the force of the spring while the workpiece is held. Mechanical springs normally are not strong enough to do this, necessitating the use of more powerful devices such as nitrogen gas springs.

Also, if the spring fails, the roller cam will malfunction as there is no force generated in that event available to return the slide.

It is an object of the present invention to provide a roller cam which provides a failsafe return of the slide even when part stripping is necessary.

SUMMARY OF THE INVENTION

The above object and other objects which will become apparent upon a reading of the following specification and claims are achieved by a roller cam mechanism including a slide mounting a main roller between two upwardly projecting lugs. The main roller is mounted on a support axle shaft which projects beyond each lug to comprise overhung ends. An auxiliary roller is mounted on each overhung axle end, which rollers in turn are received in angled slots formed in each of a pair of side plates included in the driver assembly. The auxiliary rollers are pulled by a surface on a respective side plate slot as the upper platen is retracted so as to positively return the slide to its retracted position if a return spring also included is not effective to do so.

The slide is normally returned by the return spring which is received in a lengthwise extending space in the slide, and captured between a fixed pin and a retainer so as to be compressed when the slide is advanced by the driver ramp surface engaging the main roller.

Thus, only in the event the spring breaks or develops insufficient force to strip a tool from a workpiece, auxiliary rollers are engaged to positively return the slide when the press platen mounting the driver assembly is raised.

DETAILED DESCRIPTION

Figure 1:
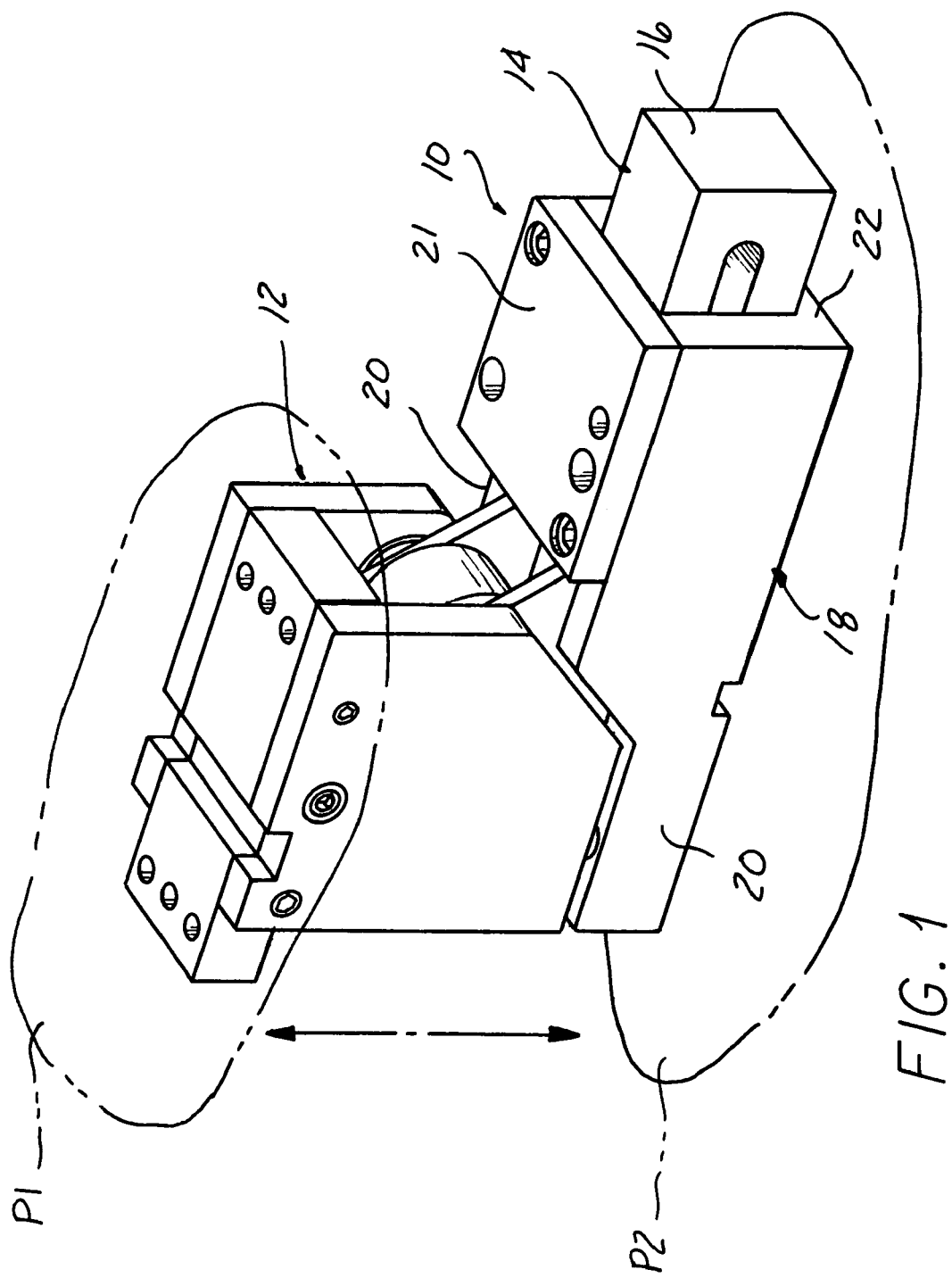
FIG. 1 is a pictorial view of a roller cam and engaged driver assembly according to the present invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, a roller cam mechanism 10 adapted to be mounted on a press upper platen P1 is shown, engaged with a driver assembly 12 adapted to be mounted on a press lower platen P2 and driven thereby to an extended position to accomplish a piercing or other secondary operation on a workpiece (not shown).

The roller cam 10 includes a slide 14 mounting the tooling (not shown) which is attached at the end of an elongated portion 16 thereof. A slide mount 18 includes a pair of side walls 20 and a bottom wall 22 defining a guide way 19 for receiving the slide 14 and guiding the same during stroking thereof. A top plate 21 confines the elongated tool mounting portion 16 of the slide 14.

The driver assembly 12 includes a member 24 housing a main ramp surface 25 aligned with a central cam main roller 28 to engage the same.

The main cam roller 28 is rotatable on the center part of an axle shaft 30 received in aligned bores 34 in a pair of upright spaced part lugs 32.

The axle shaft 30 has reduced diameter ends 36 each of which protruding past the outside of a respective one of the lugs 32 and receiving an outboard retraction auxiliary cam elements comprising rollers 38 held thereon by a retainer 40. Each auxiliary cam roller 38 is engaged by a slot 42 in a respective side plate 44 attached to the cam driver 24.

The slide 14 has a lengthwise elongated space 46 formed therein which receives a helical compression spring 48. Spring 48 is engaged at one end by a cross pin 50 fixed extending between side walls 20 of the slide mount 18, passing through a slot 52 in the slide 14.

Figure 2:
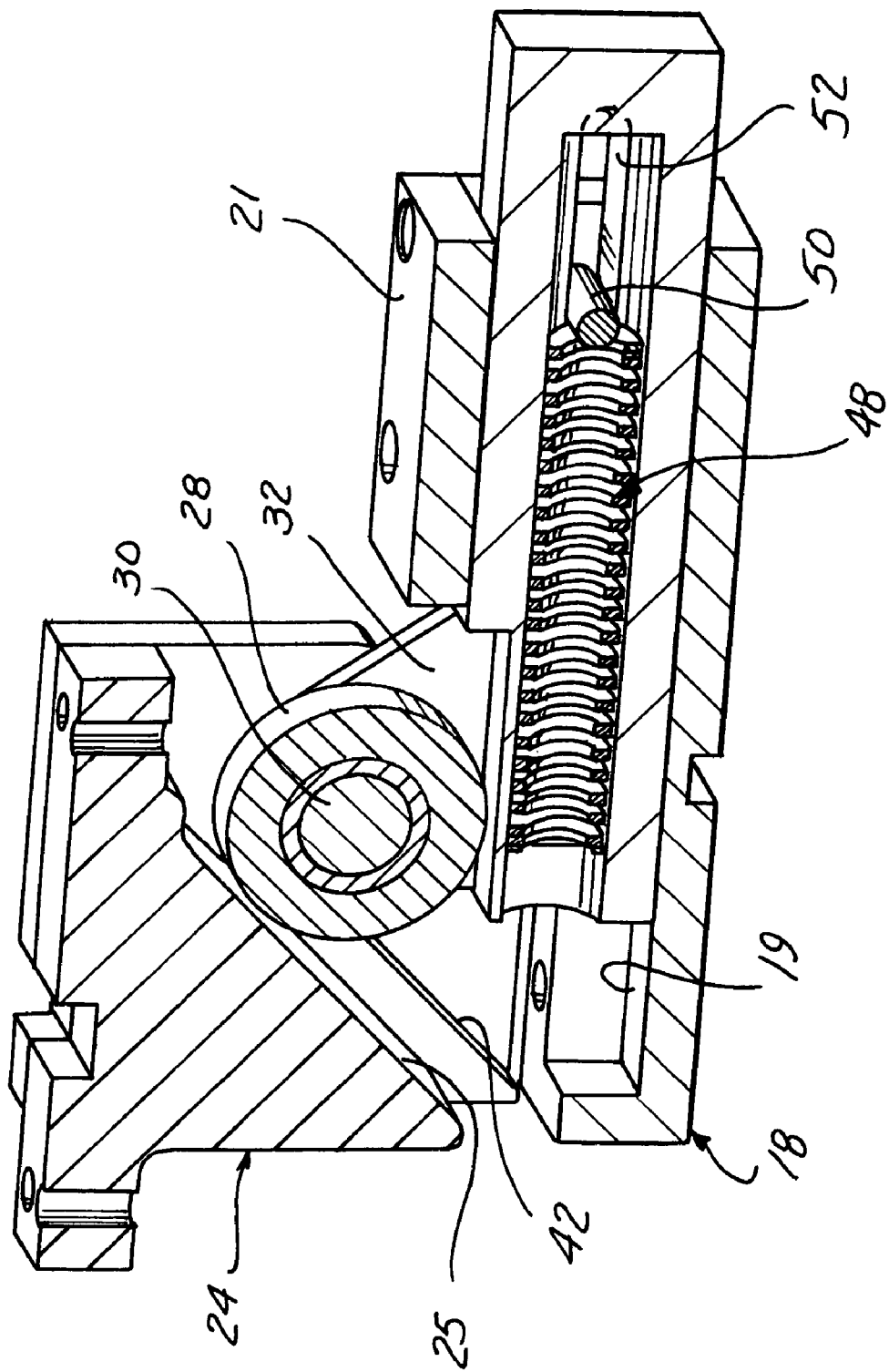
FIG. 2 is a side pictorial view of the roller cam and driven assembly, shown broken away along its longitudinal axis.
Figure 3:
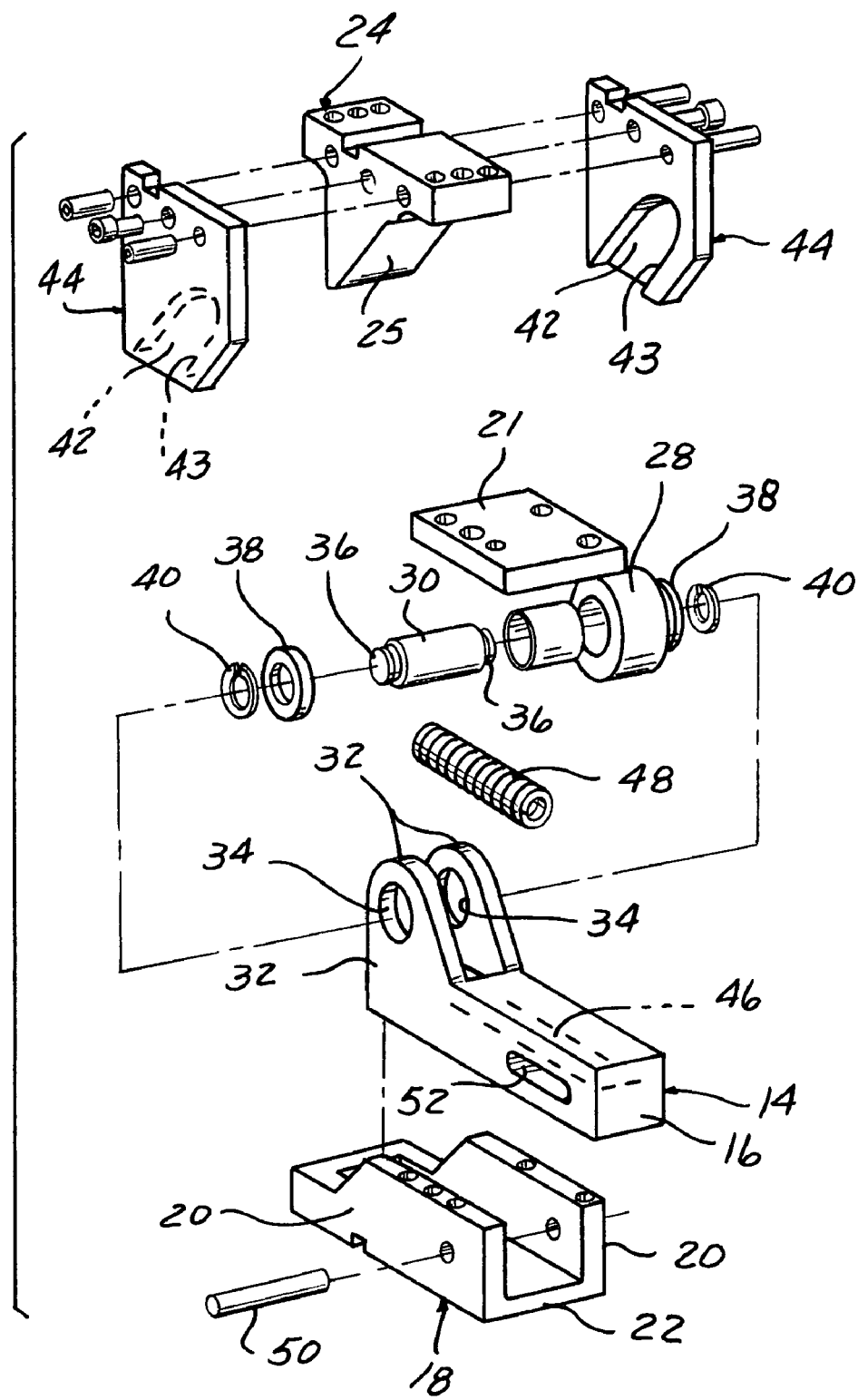
FIG. 3 is an exploded pictorial view of certain components of the roller cam mechanism and driver assembly shown in FIGS. 1 and 2.
Figure 4:
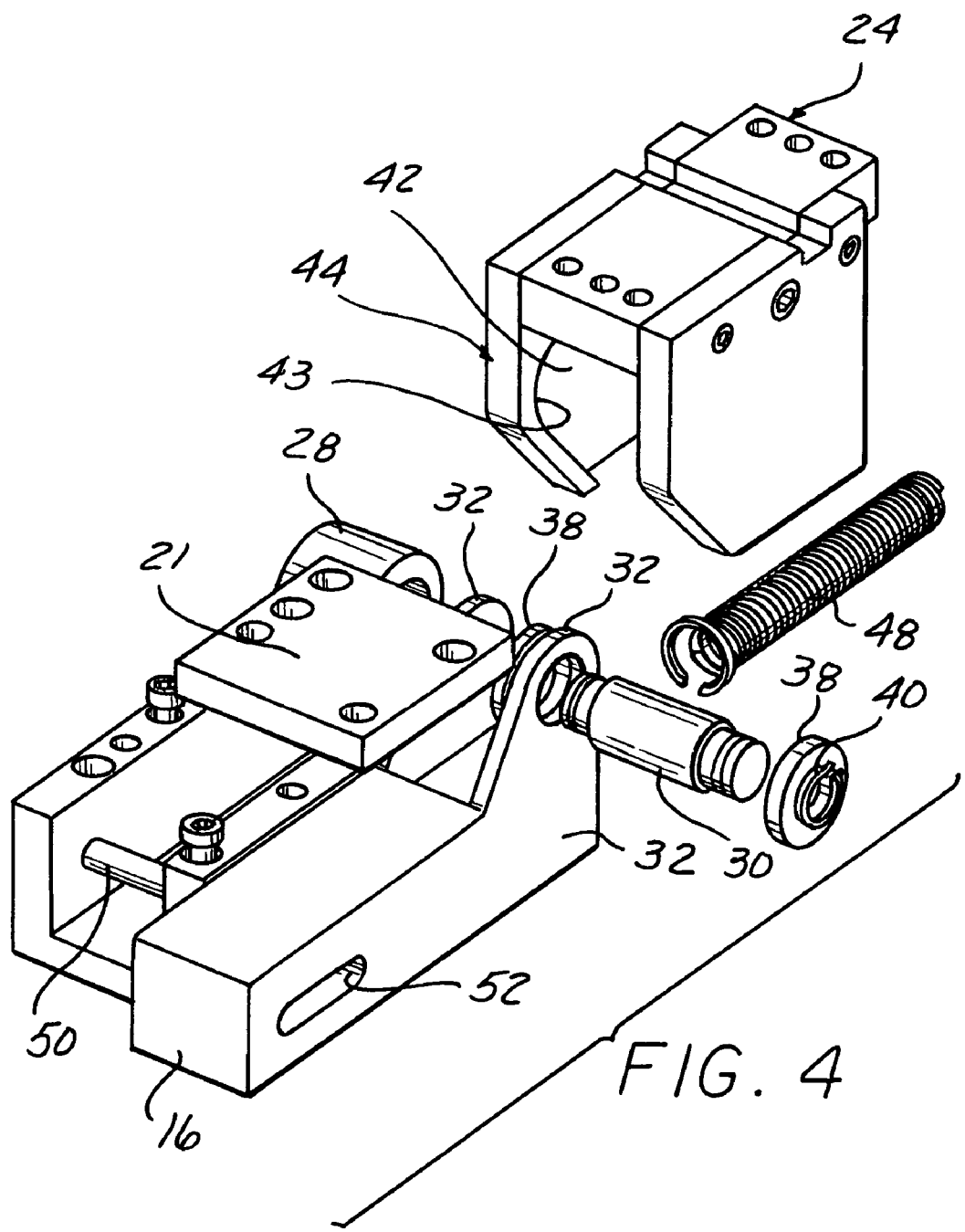
FIG. 4 is a pictorial partially exploded view from another angle of the roller cam mechanism and driver assembly shown in FIGS. 1 and 2.
Figure 5:
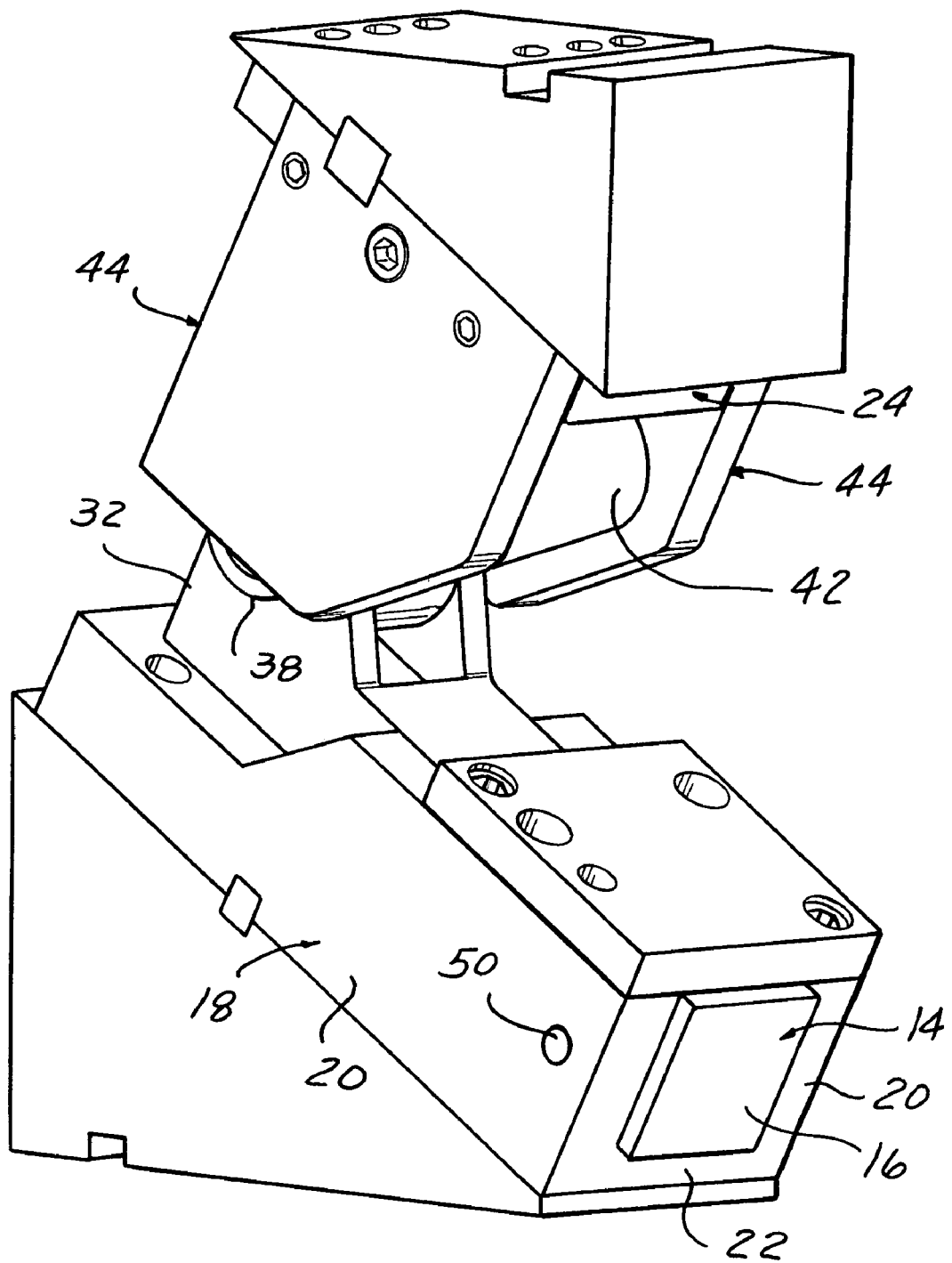
FIG. 5 is a pictorial view of the roller cam mechanism and driver assembly of FIGS. 1–4 mounted in a press for an angled motion.

Thus, when the slide 14 is advanced by the ramp 25 forcing the main cam roller 28 to the right as viewed in FIG. 2, the spring 48 is compressed.

As the driver assembly 12 is raised, the compressed spring 48 forces the slide 14 back to the left.

If the spring 48 is broken or has insufficient force to strip the tooling out of the workpiece, the outboard retraction auxiliary rollers 38 engage one of the respective slot walls 43 and forcibly raise the same, causing the slide 14 to be positively retracted.

The invention claimed is:

1. A roller cam and driver assembly comprising:
 a driver assembly adapted to be attached to a press platen, said driver assembly having a portion being formed with a ramp surface;
 a roller cam mechanism including a slide mounted in a slide mounting body adapted to be attached to another press platen for motion in a direction transverse to motion of said press platen on which said slide mounting body is installed, said roller cam mechanism including a main roller rotatably mounted to said slide so as to be engaged with said driver ramp surface upon closing of said press platens;

said roller cam mechanism also including a retraction spring compressed by advancing of said slide and causing said slide to be retracted upon withdrawal of said driver;

said roller cam mechanism further including mating retraction cam elements on each of said slide and driver assembly respectively, positively causing retraction of said slide upon withdrawal of said driver assembly.

2. An assembly according to claim 1 wherein said mating retraction cam elements comprise an auxiliary roller aligned with said main cam roller and a corresponding cam surface on said driver assembly puffing on said retraction roller to positively retract said slide.

3. An assembly according to claim 1 wherein said roller cam mechanism includes a pair of retraction cam elements each comprising an outboard retraction auxiliary roller aligned with said main cam roller and on one side thereof, and said driver includes retraction cam surfaces pulling on a respective outboard retraction auxiliary rollers upon separation of said press platens.

4. An assembly according to claim 3 wherein said retraction spring is a helical spring disposed within a lengthwise space in said slide, one end of said spring engaged by said slide, an opposite end of said spring engaged with a pin fixed to said slide mounting body so that said spring is compressed by advancing movement of said slide.

5. An assembly according to claim 3 wherein said slide has a pair of upright spaced apart lugs, said lugs formed with aligned bores receiving an axle shaft mounting said main cam roller, said axle shaft having opposite ends each protruding past a respective lug and mounting a respective outboard retraction auxiliary roller.

6. An assembly according to claim 5 wherein said driver including side plates mounted to each side of said portion formed with said ramp surface, and formed with angled cam slots located to receive a respective outboard retraction auxiliary roller.

* * * * *